Figure 1:
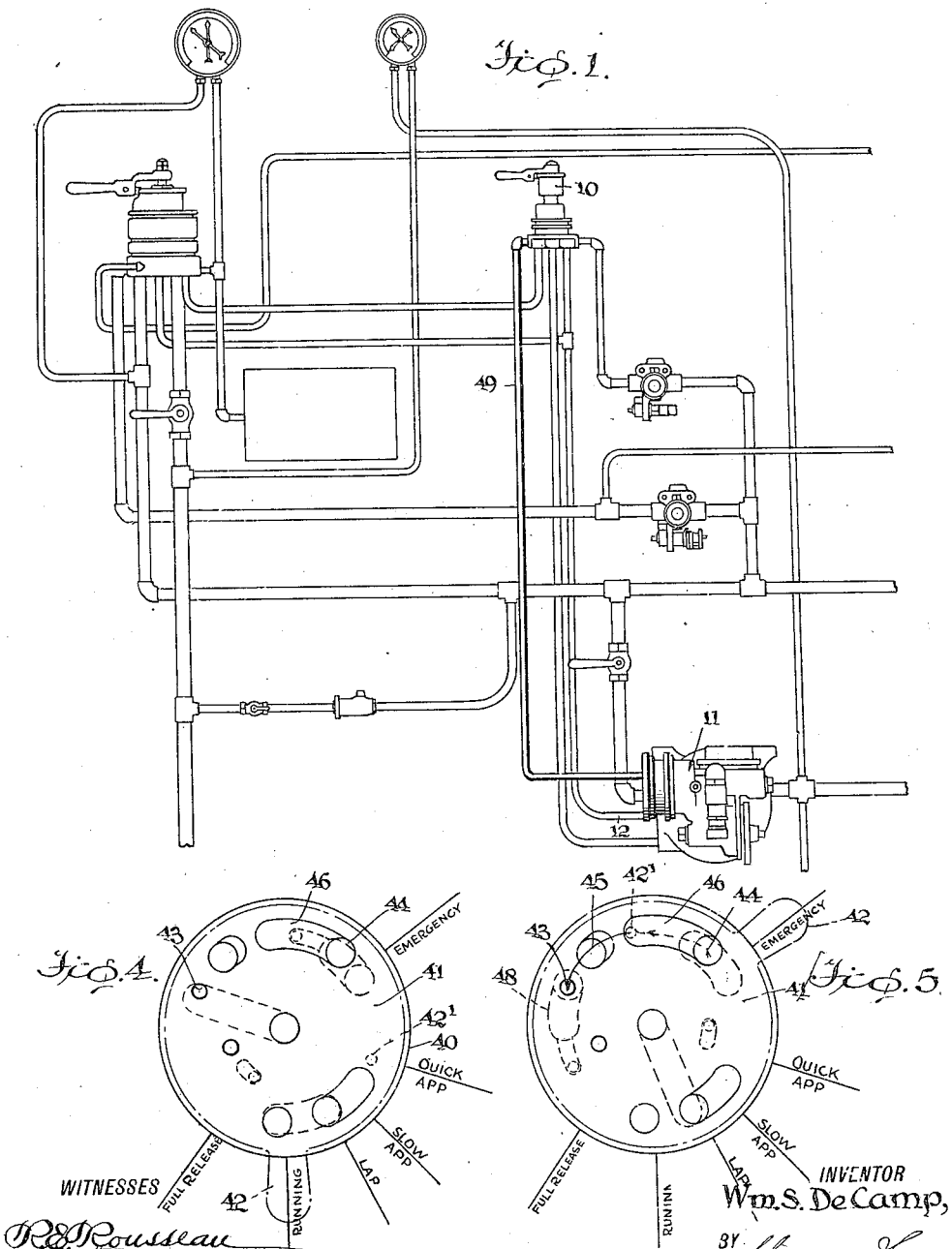

June 3, 1924.                                                               1,496,452
W. S. DE CAMP
BRAKE FOR RAILROAD TRAINS
Filed Feb. 2, 1923            2 Sheets-Sheet 2

WITNESSES
R. E. Rousseau

INVENTOR
Wm. S. DeCamp,
BY Munn & Co.
ATTORNEYS

Patented June 3, 1924.

1,496,452

UNITED STATES PATENT OFFICE.

WILLIAM S. De CAMP, OF CHILLICOTHE, OHIO.

BRAKE FOR RAILROAD TRAINS.

Application filed February 2, 1923. Serial No. 616,529.

*To all whom it may concern:*

Be it known that I, WILLIAM S. DE CAMP, a citizen of the United States, and a resident of Chillicothe, in the county of Ross and State of Ohio, have invented certain new and useful Improvements in Brakes for Railroad Trains, of which the following is a specification.

This invention relates to air brakes for railroad trains.

The present invention more particularly relates to the Westinghouse air brake equipment for locomotives designated "No. 6, E T." In this air brake system, there is employed an automatic brake valve and an independent brake valve which are interconnected and the independent brake valve utilized for operating the brakes upon the engine and associated tender, while the automatic brake valve is utilized for applying the brakes upon the cars or coaches drawn by the engine, and also engine and tender.

The manner in which these valves may be manipulated is well understood by those skilled in the art.

The independent valve operates in conjunction with the distributing valve, and the compressed air from the main reservoir of the system must pass through this distributing valve previous to entering the brake cylinders of the engine. In this distributing valve there is included an application chamber in which there is movable a piston, and said piston when moved is adapted to actuate a slide valve which operates to connect the brake cylinders of the engine and the brake cylinders of the tender with the main reservoir of compressed air. Compressed air may be admitted to the application chamber of the distributing valve by manipulating the independent brake valve.

When utilizing the independent brake valve for admitting air to the application chamber of the distributing valve, air must pass through a certain pipe and if this pipe becomes broken or disconnected from the application chamber of the distributing valve, then it is impossible to apply the brakes to the engine and tender. It has been observed that this contingency, that is the breaking of this particular pipe, is possible, and when such happening occurs the engine, if under headway, is uncontrollable, and accidents may result.

With the above in view, it is the object of the present invention to provide an additional means whereby the air may be admitted to the application chamber of a distributing valve in a system of the kind referred to at any moment, thus to apply the brakes of the engine. By this, it is meant that means are associated with the application chamber whereby the independent brake valve may be utilized to operate the piston in the distributing valve whereby to set the brakes upon the engine and tender at any time, when the other means for doing this same thing is inoperative.

The present invention is illustrated in the accompanying drawings, in which

Figure 2:
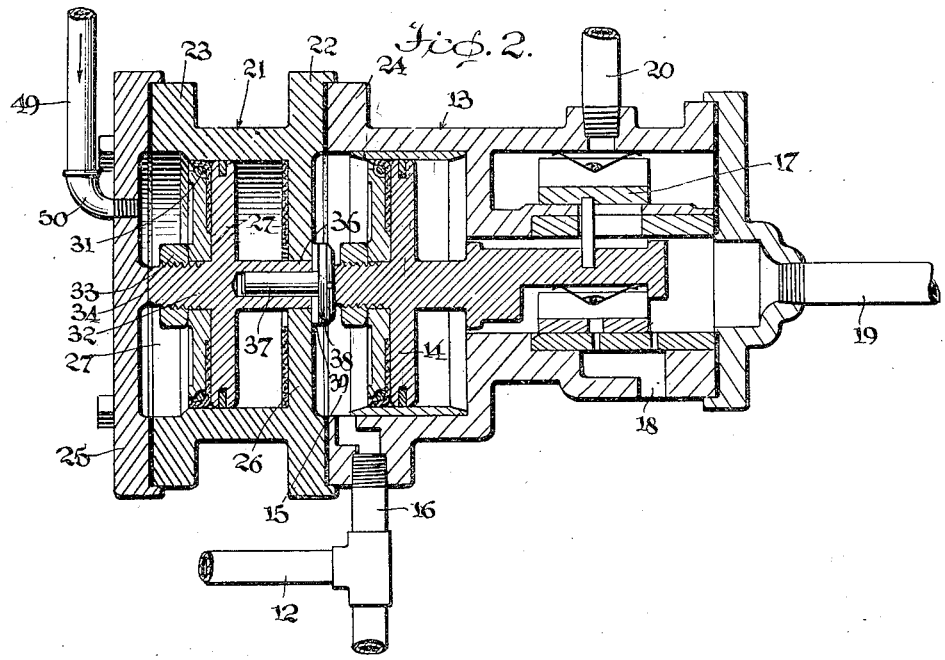
Figure 3:
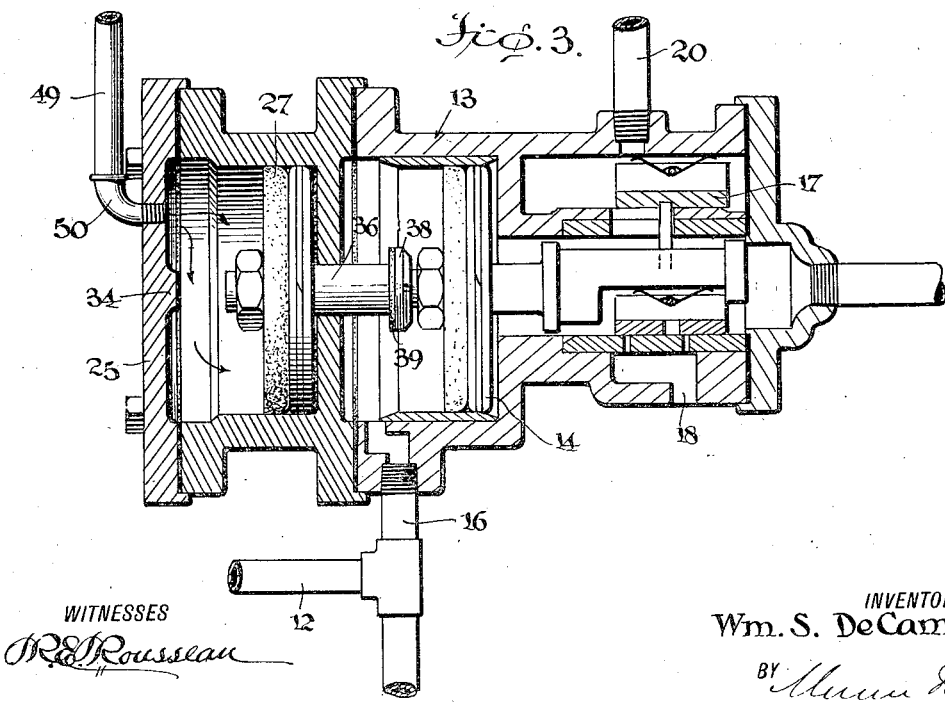

Figure 1 represents a diagrammatic view of a portion of the so-called "Westinghouse air brake system, No. 6, E T.," and showing the present invention applied, Figure 2 is a sectional view of the distributing valve embodying the present invention and showing the piston within the application chamber in its non-operative position, that is, for connecting the interior of the associated brake cylinders with the atmosphere, Figure 3 is a view similar to Figure 2 showing the piston in its operative position, that is, for applying the brakes, Figure 4 is a schematic view showing the independent valve when in position to release the brakes, and also showing the additional ports for the emergency application provided for by the present invention, Figure 5 is a view similar to Figure 4 showing the valve operated for utilizing the emergency application of the present invention.

Referring to Figure 1 of the drawings, at 10 is indicated generally the independent brake valve, and at 11 the distributing valve. The present invention is only associated with these two units of the air brake system, and therefore specific reference to the remainder of the different connections and units is unnecessary. As heretofore stated, should a certain pipe extending between the application chamber of the distributing valve 11 and independent brake valve 10 break or be opened to the atmosphere, the independent brake valve cannot be manipulated to operate the valve for setting the brakes upon the engine and its associated tender. The automatic brake valve might be utilized for operating the brakes upon a train, but this brake valve would not set the brakes upon the engine and its associated tender with this particular pipe broken. The pipe referred to is designated in Figure 1 by the reference numeral 12, and commonly referred to as the application cylinder pipe.

Referring to Figures 2 and 3, 13 indicates generally a cylinder in which there is movable a piston 14. This piston is disposed in the application chamber of the cylinder 13, and said application chamber exists forward to the piston 14, as at 15. The pipe 12 communicates with the application chamber through the pipe 16. The piston 14 is adapted to move the slide valve generally indicated by the reference numeral 17, and this piston when in the position shown in Figure 2, brings the slide valve 17, so that the same establishes communication between the exhaust port 18 and the brake cylinder pipe 19.

Upon the piston 14 assuming the position shown in Figure 3, then the brake cylinders are connected with the main air reservoir through the pipe 20, and the brakes will be applied. It may be here stated that the pipe 16 also communicates with the automatic brake valve for operating the piston 14 through this particular valve. This operation is not a part of the present invention, and therefore need not be further referred to.

In carrying out the present invention, the head at one end of the cylinder 13 is removable, and there is substituted therefor an auxiliary cylinder 21. The cylinder 21 may comprise a central cylindrical portion terminating at each end in a flange as at 22 and 23, respectively. The flange 22 is fitted directly upon the head flange 24 of the cylinder 13, and secured in any desirable manner. The head taken from the cylinder 13 may be fitted upon the outer end of the cylinder 21 as indicated at 25, and bolted securely thereto. The cylinder 21 is formed at its inner end with a closure 26, and within this cylinder there is slidably positioned a piston head 27. This piston head is preferably constructed as piston 14 and is provided with a similar packing as shown. The piston also has a stud 32 extending axially therefrom upon which there may be threaded a nut 33. This structure is preferably the same as piston 14. The stud 32 is adapted to abut a protrusion 34 carried by the cylinder head 35, thus to limit the outward movement of the piston head. The other side of the piston head has extending therefrom a nipple 36 which is in axial alinement with the stud 32 and which slidably accommodates a pin 37, said pin carrying upon its one end a head 38 and interposed between this head and the nipple is a washer or packing ring 39. The head 38 is adapted to engage the piston 14 when the piston 27 is moved inwardly and thus to move the piston 14 to the position shown in Figure 3. Upon the piston 14 moving outwardly the same will return the piston 27 to the position shown in Figure 2.

As shown in Figures 4 and 5, the independent valve may be represented by a stationary member or disk 40 and a rotary disk 41, said rotary disk having a handle 42 whereby the same may be manipulated. The valve members shown represent the customary construction of the same members in the independent brake valve used with this particular air brake system, with the exception that in each instance, suitable ports are provided whereby to carry out the present invention. As shown in Figure 1, the rotary disk member 41 is provided with an additional port 42'. It is thought that by these views, the usual operation of these valve members may be understood, that is, by moving the handle to its extreme clockwise direction, the same may be brought to full release, as indicated. Then by moving the handle in a right hand direction, the same may be brought into its running position, lap position, slow application and quick application. These different positions of the lever arm 42 may be used by the engineer for operating the brakes upon the associated engine and tender. However, in case the pipe heretofore referred to breaks, that is, the pipe connected to the application chamber of the distributing valve, the engineer will be unable to operate the brakes upon the engine and tender, and at this moment he must resort to this additional application provided for by the present invention, and the handle 42 should then be moved to register with the word "Emergency" shown in Figures 4 and 5.

Upon this occurring, the port 42' establishes communication between the compressed air supply port indicated at 44 and the port 43, the air travelling in the direction denoted by the arrow 45. That is, the air moves from the port 44 through a recess 46 formed upon the bottom of the rotary member 41 and thence through the port 42', formed in this rotary member, and then over the rotary valve member and downward through the port 43 and into pipe 49. The pipe 49 extends to the cylinder 21 and communicates therewith through the L-fitting 50, Figures 2 and 3. Upon the engineer moving the handle 42 of the independent valve to this last named position, air is admitted to the outer end of the auxiliary cylinder 21, and thereby to move the piston 27 within this cylinder inwardly and which in turn will move the piston 14 inwardly, whereby to operate the slide valve 17 to connect the brake cylinders with the compressed air pipe 20, and thus apply the brakes. As before stated, this application is only made in case the pipe 12 should break or become disrupted so that air cannot be transmitted therethrough to the application chamber of the distributing valve 11.

It is believed from the foregoing description that the entire operation of the present invention can be clearly understood. It is of course to be borne in mind that the present invention does not change the general operation of the air brake system with which it is associated, and that it is an independent application of the brakes upon the engine and tender with which the air brake system is associated, and only to be used at the time the general means for applying the brakes is inoperative.

I claim:—

1. In an air brake system of the character described, having a distributing valve with valve mechanism operable by compressed fluid for connecting the associated brake cylinders with a supply of compressed fluid, and an operating valve whereby to operate the distributing valve, in combination, auxiliary means whereby the distributing valve may be independently operated for connecting the brake cylinder with the compressed fluid for the purpose described.

2. In an air brake system of the character described, having a distributing valve with valve mechanism operable by compressed fluid for connecting the associated brake cylinders with a supply of compressed fluid, and an operating valve whereby to operate the distributing valve, in combination, an auxiliary piston adapted to operate the distributing valve whereby to connect the brake cylinder with the compressed fluid when moved in one direction, and valve means operable from a remote point whereby the auxiliary piston may be independently operated.

3. In an air brake system of the character described, having a distributing valve including a piston movable under the influence of compressed air, whereby to connect the associated brake cylinders with a supply of compressed air, and an operating valve whereby to operate said piston, in combination, an auxiliary piston adapted to operate the first named piston for operating the distributing valve to connect the brake cylinders with the compressed air when moved in one direction and means operable from a remote point whereby the auxiliary piston may be independently operated.

4. In an air brake system of the character described, having a distributing valve including a piston movable under the influence of compressed air, whereby to connect the associated brake cylinders with a supply of compressed air, and an operating valve whereby to operate said piston, in combination, an auxiliary piston adapted to operate the first named piston for operating the distributing valve to connect the brake cylinders with the compressed air when moved in one direction, and means whereby the operating valve may be utilized for operating said auxiliary piston.

5. In an apparatus of the character described, a pair of aligned cylinders, a piston movable within each cylinder, and adjustable means between the pistons whereby movement of one piston may be utilized for moving the other piston.

6. In an apparatus of the character described a pair of aligned cylinders, a piston movable within each cylinder and rods carried by said pistons adapted to be brought into engaging relation whereby one piston may be utilized for moving the other piston, and adjustable spacing means interposed between opposing ends of said rods.

WILLIAM S. De CAMP.